United States Patent [19]
Hokazono et al.

[11] Patent Number: 5,179,917
[45] Date of Patent: Jan. 19, 1993

[54] INTAKE AIR CONTROL DEVICE FOR AN INTERNAL COMBUSTION ENGINE

[75] Inventors: Yuichi Hokazono; Toshiaki Konomi, both of Susono, Japan

[73] Assignee: Toyota Jidosha Kabushiki Kaisha, Toyota, Japan

[21] Appl. No.: 882,706

[22] Filed: May 14, 1992

[30] Foreign Application Priority Data

May 21, 1991 [JP] Japan .................................. 3-116255

[51] Int. Cl.⁵ .......................... F02M 9/12; F02B 29/02
[52] U.S. Cl. .............................. 123/52 MF; 123/336; 137/855
[58] Field of Search ......... 123/52 M, 52 MC, 52 MB, 123/52 MF, 306, 336; 137/855, 856

[56] References Cited

U.S. PATENT DOCUMENTS

| | | | |
|---|---|---|---|
| 4,474,145 | 10/1984 | Boyesen | 123/52 MF |
| 4,779,580 | 10/1988 | Rutschmann | 123/52 MF |
| 5,092,288 | 3/1992 | Staerzl | 137/855 |

FOREIGN PATENT DOCUMENTS

| | | | |
|---|---|---|---|
| 3024812 | 1/1982 | Fed. Rep. of Germany | 123/52 MF |
| 3328584 | 2/1984 | Fed. Rep. of Germany | 123/52 MF |
| 58-152123 | 9/1983 | Japan . | |
| 58-192921 | 11/1983 | Japan . | |
| 0889878 | 12/1981 | U.S.S.R. | 123/52 MF |

Primary Examiner—David A. Okonsky
Attorney, Agent, or Firm—Kenyon & Kenyon

[57] ABSTRACT

An intake air control device including an intake passage provided with reed valves to prevent a back flow of intake air and exhaust gas. The intake passage has a predetermined length and a substantially uniform section, except for an enlarged portion close to an intake valve. A reed valve assembly is arranged in the enlarged portion and has side walls which divide an inside space of the enlarged portion into a first space surrounding the side walls, and a second space surrounded by the side walls, to have a section similar to the uniform section, and are mounted with reed valves to allow an intake air to flow only from upstream to the first space. When the current engine speed condition is a high engine speed condition, a closing unit for closing the second space downstream of the reed valve is opened, and a communicating unit for communicating the first space with the second space is interrupted.

12 Claims, 6 Drawing Sheets

INTAKE AIR CONTROL DEVICE FOR AN INTERNAL COMBUSTION ENGINE

BACKGROUND OF THE INVENTION

1. Field of the Invention

The present invention relates to an intake air control device for an internal combustion engine, the device comprising reed valves mounted in an intake passage to prevent a back flow of intake air and exhaust gases.

2. Description of the Related Art

An intake air control device similar to the above was filed as Japanese patent application No. 2-322671, by the present applicant. This intake air control device comprised reed valves, each mounted at side walls of a reed valve assembly body formed in the shape of a hollow square column and surrounding a control valve arranged downstream of the reed valves, instead of a single reed valve mounted at a control valve. Accordingly, when the control valve is closed, a maximum amount of intake air supplied via the reed valves is increased, whereby it is possible to supply the intake air via the reed valves not only during a low engine speed and high engine load driving condition, but also during a middle engine speed and high engine load driving condition, as in practice an engine is frequently driven in the middle engine speed and high engine load driving condition. A back flow of intake air and exhaust gases during this driving condition is also prevented by the reed valves, and thus a higher torque can be obtained to thereby increase the charging efficiency.

The back flow of intake air and exhaust gases is prevented to raise an inside pressure of an intake passage between an intake valve and the reed valves in a compression stroke, and accordingly, a capacity of the intake passage between the intake valve and the reed valves is preferably reduced, to increase the efficiency of the prevention of the back flow, and therefore the reed valve assembly is arranged at a position relatively close to the intake valve.

An inertia supercharging is generally carried out, to increase the torque in a high engine speed condition, and this requires a relatively long intake passage having a substantially uniform section between the intake valve and a surge tank as an open end.

Nevertheless, the intake passage to which the above intake air control device is mounted is provided with an enlarged portion so that the reed valve assembly can be mounted in a position relatively close to the intake valve, but this enlarged portion forms an open end, and thus the effect of an inertia supercharging cannot be obtained under a high engine speed condition.

SUMMARY OF THE INVENTION

Therefore, an object of the present invention is to provide an intake air control device for an internal combustion engine, which device can increase the torque by the effect of an inertia supercharging in a high engine speed condition, and can maintain the increased torque obtained by the reed valves in a low and middle engine speed condition.

According to the present invention there is provided an intake air control device comprising: an intake passage having a predetermined length and a substantially uniform section, except for an enlarged portion relatively close to an intake valve; a reed valve assembly arranged in the enlarged portion, and having side walls which divide an inside space of said enlarged portion into a first space surrounding the side walls and a second space surrounded by the side walls, to provide a section similar to the uniform section, and on which are mounted reed valves allowing an intake air to flow only from upstream to said first space; closing means for normally closing the second space downstream of the reed valves; communicating means for normally communicating the first space with the second space downstream of the closing means; first detection means for detecting a current engine speed condition; first control means for controlling the closing means in response to the current engine speed condition, to open the second space when the current engine speed condition is a high engine speed condition; and second control means for controlling the communicating means in response to the current engine speed condition, to interrupt the first space with the second space when the current engine speed condition is a high engine speed condition.

The present invention will be more fully understood from the description of preferred embodiments of the invention set forth below, together with the accompanying drawings.

DESCRIPTION OF THE PREFERRED EMBODIMENTS

Figure 1:
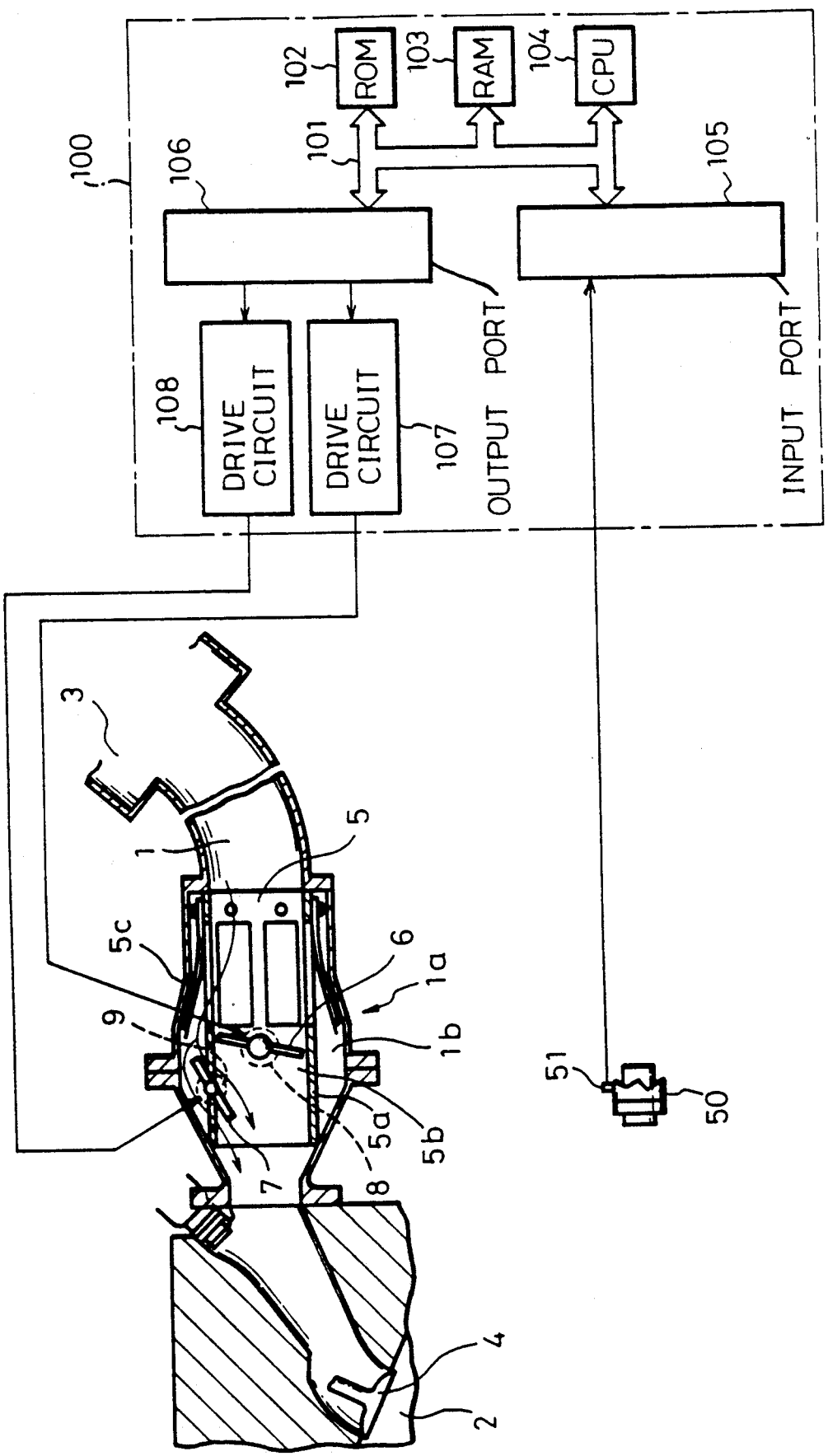
FIG. 1 is a schematic view of an intake air control device for a first embodiment in a low or middle engine speed condition.
Figure 2:
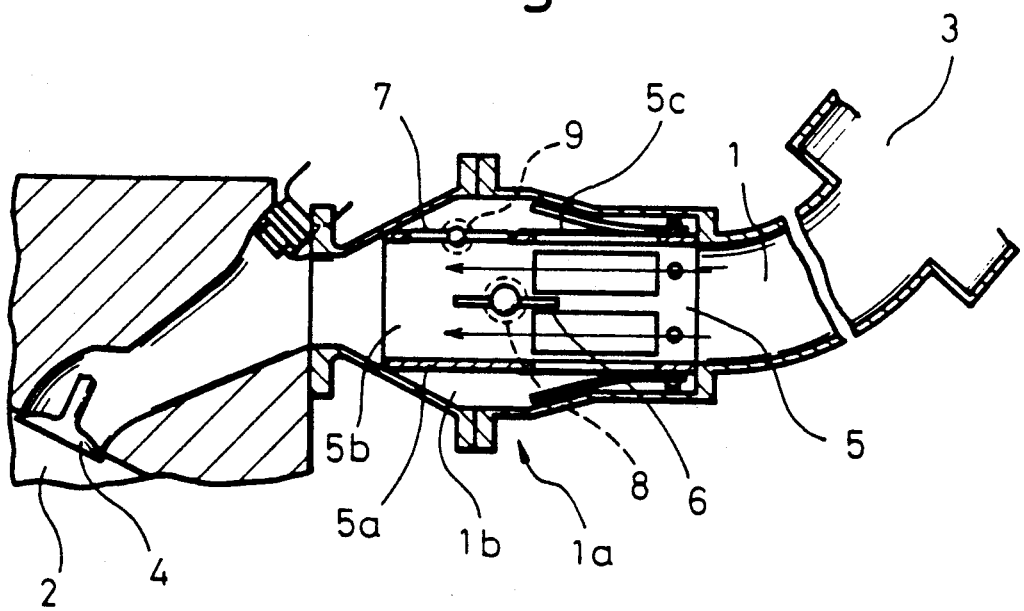
FIG. 2 is a schematic view similar to that of FIG. 1 in a high engine speed condition.

FIGS. 1 and 2 show a first embodiment, wherein in FIG. 1 reference numeral 1 designates an intake passage leading to a combustion chamber 2 via an intake valve 4 and having a predetermined length between the intake valve 4 and a surge tank 3; a portion 1a close to the intake valve 4 of the intake passage 1 and having a section that is gradually enlarged from the upstream and downstream directions thereof, and an other portion thereof having a substantially uniform section.

A reed valve assembly 5 having a body formed as a hollow square column is arranged in the enlarged portion 1a of the intake passage 1, whereby an inside space of the enlarged portion 1a is divided into an inside space 5b of the reed valve assembly body and a space 1b surrounding four side walls 5a of the body. A first control valve 6 is mounted in the inside space 5b, to open and close same, and a section of the inside space 5b is formed to be similar to the section of the other portion of the in ake passage 1.

A second control valve 7 is mounted at the upper side wall of the reed valve assembly body and downstream of the first control valve 6, to communicate the space 1b surrounding the reed valve assembly 5 with the inside space 5b when the second control valve 7 is opened. Four pairs of reed valves 5c are mounted respectively at the four side walls 5a of the reed valve assembly body, upstream of the first control valve 6, to cover each pair of openings thereof and allow intake air to flow only from an upstream side to the space 1b.

All of these reed valves 5c allow a desired amount of intake air in a middle engine speed and high engine load driving condition to pass therethrough, because a longitudinal length of the reed valve assembly 5 can be freely selected. The second control valve 7 is formed so that the desired amount of intake air in this driving condition can flow smoothly from the space 1b to the inside space 5b without encountering a high resistance, when the valve 7 is opened.

Two step motors 8 and 9, driving the first and second control valves 6 and 7 respectively, are mounted outside of the intake passage 1, and each of these step motors 8 and 9 is controlled by the electronic control unit (ECU) 100.

The ECU 100 is constructed as a digital computer and includes a ROM (read only memory) 102, a RAM (random access memory) 103, a CPU (microprocessor, etc.) 104, an input port 105, and an output port 106. The ROM 102, the RAM 103, the CPU 104, the input port 105, and the output port 106 are interconnected by a bidirectional bus 101.

A distributor 50 is provided with a crank angle sensor 51 connected to the input port 105, and the output port 106 is connected to the two step motors 8 and 9 via corresponding drive circuits 107 and 108 respectively.

The ECU 100 detects a current engine speed on the basis of a signal from the crank angle sensor 51, and controls the first and second control valves 6 and 7 on the basis of the current engine speed condition. When the current engine speed condition is a low or middle engine speed condition, regardless of an engine load, the first control valve 6 is closed and the second control valve 7 is opened by the step motors 8 and 9 respectively, as shown in FIG. 1. Accordingly, the intake air in this condition enters the space 1b via the reed valves 5c and is smoothly supplied to the combustion chamber 2 via the second control valve 7. A back flow of intake air and exhaust gases is prevented by the first control valve 6 and the reed valves 5c, whereby it is possible to obtain a higher torque to thus increase the charging efficiency in the combustion chamber 2.

When the current engine speed condition is a high engine speed condition, the first control valve 6 is opened and the second control valve 7 is closed by the step motors 8 and 9 respectively, as shown in FIG. 2. Accordingly, the intake air in this condition is supplied to the combustion chamber 2 to pass through the inside space 5b of the reed valve assembly body. Because the inside space 5b has a section similar to the section of the other portion of the intake passage 1, the intake air can flow smoothly and the intake passage 1 has s substantially uniform section. The intake passage 1 between the intake valve 4 and the surge tank 3 as the open end, is determined to be a length such that an inertia supercharging will occur in this driving condition, whereby it also is possible to obtain a higher torque to thus increase the charging efficiency in the combustion chamber 2.

Figure 7:
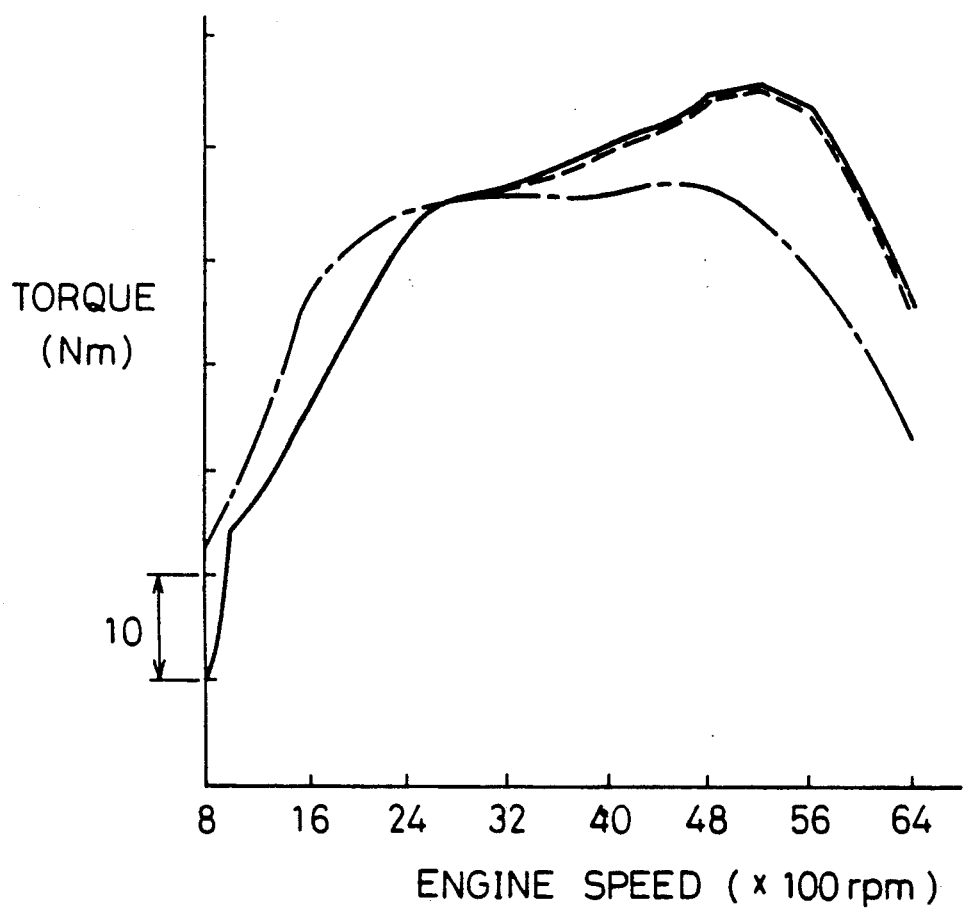

FIG. 7 shows a line graph of a generated engine torque with respect to an engine speed. In the same figure, the solid line shows the use of an engine and an intake air control device comprising an intake passage having a substantially uniform section without a reed valve, the length of which is determined to be such that an inertia supercharging will occur in a high speed driving condition; the chain line shows the use of the same engine and the prior intake air control device having the reed valve assembly; and the dotted line shows the use of the same engine and the intake air control device of the first embodiment. It can be seen that the intake air control device, of the first embodiment (dotted line), can obtain the same high torque as the prior device (chain line) at a low or middle engine speed, in comparison with the device comprising the intake passage without the reed valve (solid line), and can obtain a higher torque at a high engine speed, similar to the device comprising the intake passage without the reed valve (solid line), than the prior device (chain line).

Figure 3:
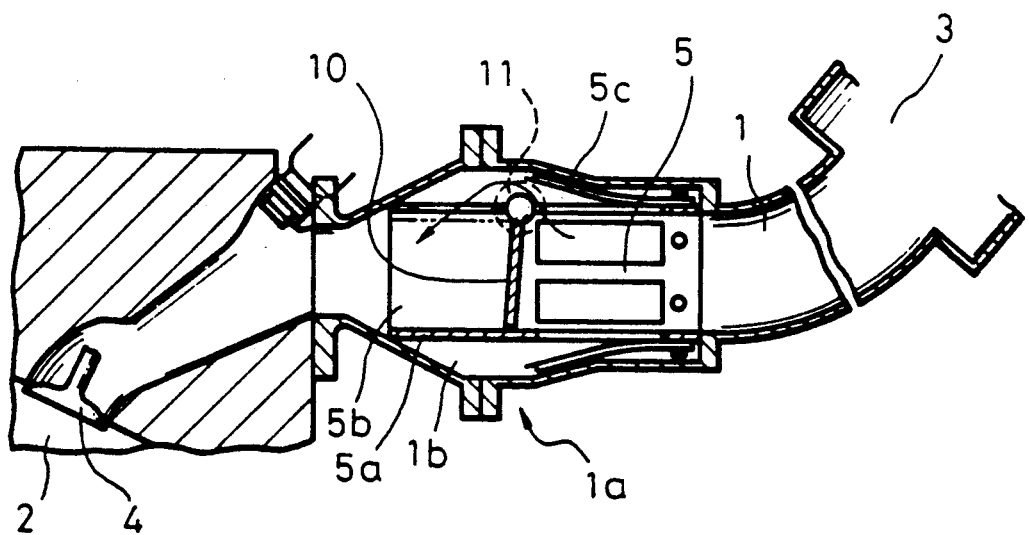
FIG. 3 is a schematic view of an intake air control device for a second embodiment.

FIG. 3 shows a second embodiment wherein the difference between the embodiments is only that a flapper valve 10 is substituted for the first and second control valves 6 and 7 in the first embodiment. The flapper valve 10 is driven by a step motor 11 controlled by an ECU (not shown) as the unit 100 in the first embodiment. When the current engine speed condition is a low or middle engine speed condition, the flapper valve 10 closes the inside space 5b of the reed valve assembly body downstream of the reed valves 5c and communicates the inside space 5b with the space 1b surrounding the body downstream of the valve 10. When the current engine speed condition is a high engine speed condition, the flapper valve 10 fully opens the inside space 5b and interrupts the inside space 5b and the space 1b. Accordingly, the second embodiment can obtain the same effects as the first embodiment, and the manufacturing costs thereof can be reduced because only the single flapper valve 10 is used, in contrast to the first embodiment.

Figure 4:
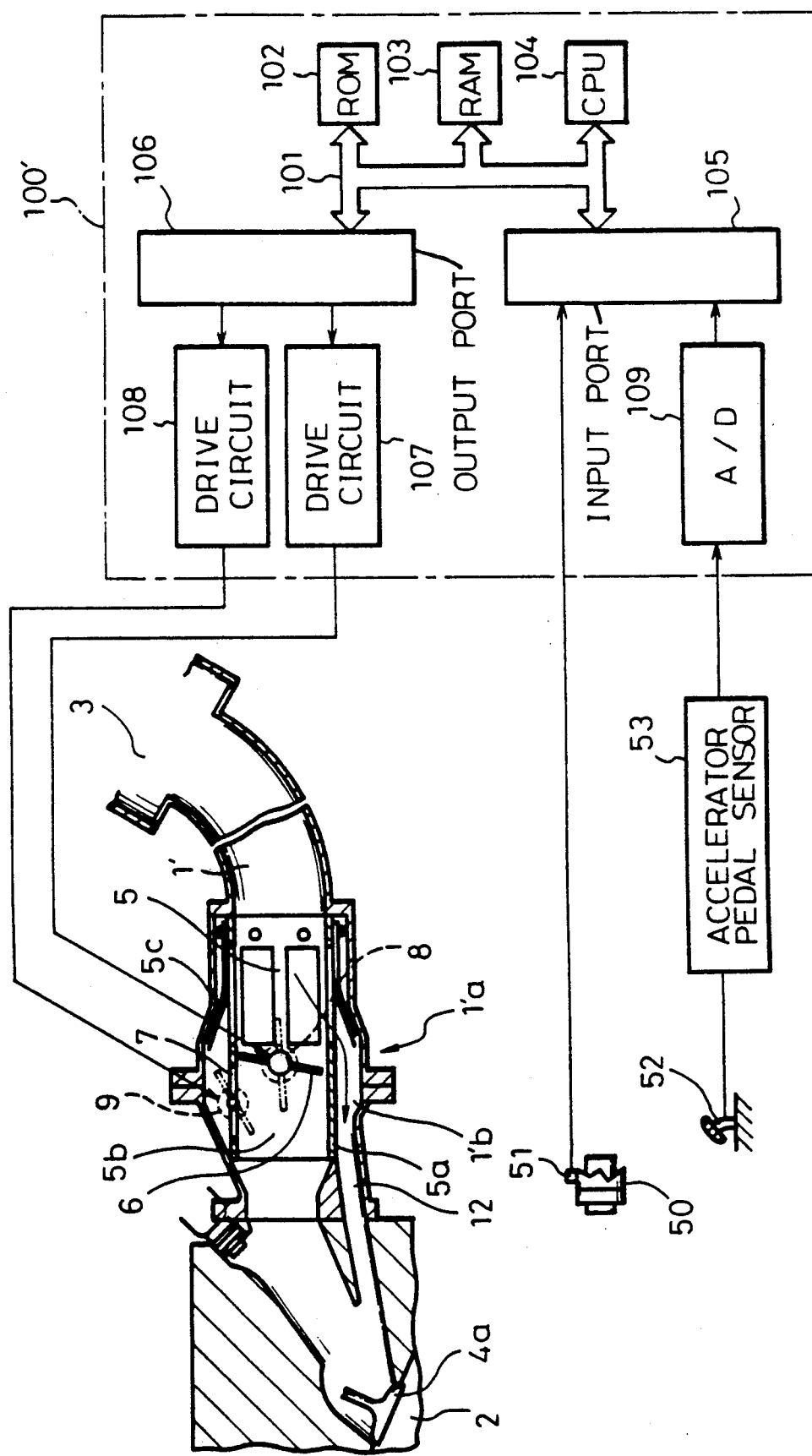
FIG. 4 is a schematic view of an intake air control device for a third embodiment.
Figure 5:
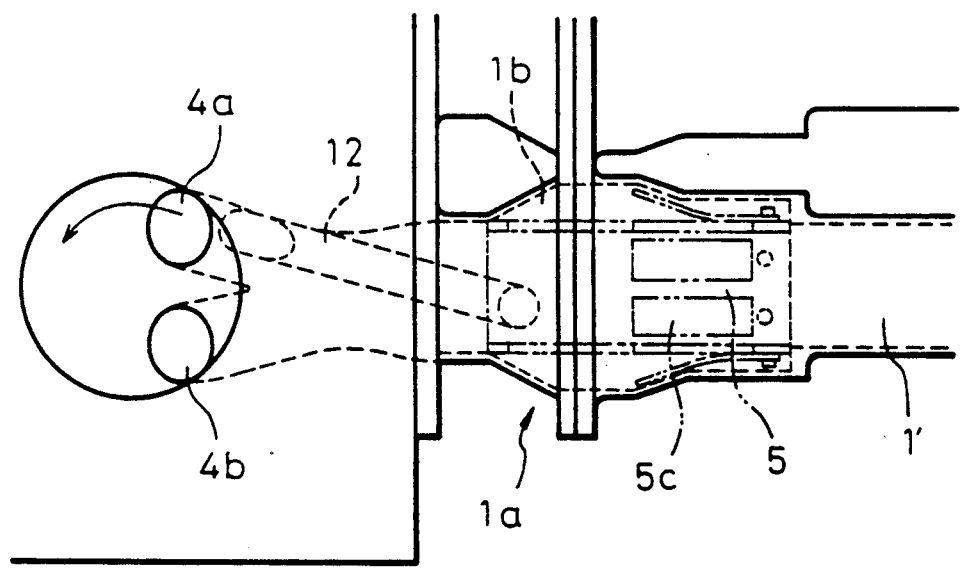
FIG. 5 is a bottom view of FIG. 4.

FIGS. 4 and 5 show a third embodiment wherein the difference between the third and first embodiments is that the former is provided with a subintake passage 12 for creating a swirl in the combustion chamber 2. An intake passage 1' is divided into two downstream of the reed valve assembly 5, and leads to the combustion chamber 2 via two intake valves 4a and 4b. The subintake passage 11 communicates the space 1'b surrounding the reed valve assembly body with the intake passage 1' at a point close to one side of the intake valve 4a. Furthermore, the input port 105 of the ECU 100' for controlling the first and second control valves 6 and 7, is connected not only to the crank angle sensor 51 but also to an accelerator pedal sensor 53, for detecting a degree of opening of an accelerator pedal 52, via an AD converter 109.

The ECU 100' detects a current engine load on the basis of a signal from the accelerator pedal sensor 53, and a current engine speed on the basis of a signal from the crank angle sensor 51, and controls the first and second control valves 6 and 7 on the basis of the current engine driving condition. When the current engine driving condition is a low engine speed and low engine load driving condition, the first and second control valves 6 and 7 are closed by the step motors 8 and 9 respectively. Accordingly, all of the intake air entering the space 1'b via the reed valves 5c is supplied to the combustion chamber 2 and passes only through the subintake passage 12, whereby a swirl is created therein, and further, the back flow of the intake air and exhaust gases is prevented by the first control valve 6 and reed valves 5c, and thus a better combustion can be obtained at this driving condition.

Once the desired amount of intake air is increased to raise an engine speed and/or load, the first control valve 6 is held closed and the second control valve 7 is opened, as in the first embodiment in FIG. 1, whereby the back flow is prevented in this driving condition, and thus a higher torque can be obtained. Moreover, in the low engine speed and middle engine load driving condition, if the second control valve 7 is partly opened, corresponding to the current engine load, a part of the intake air passes through the intake passage 1' and the remainder thereof passes through the subintake passage 12, so that the swirl is created in the combustion chamber 2 and thus a better combustion also can be obtained when the degree of opening of the second control valve 7 is relatively small.

When the engine speed raises further to reach a high engine speed, the first control valve 6 is opened and the second control valve 7 is closed, and thus a higher torque can be obtained by the inertia supercharging.

Figure 6A:
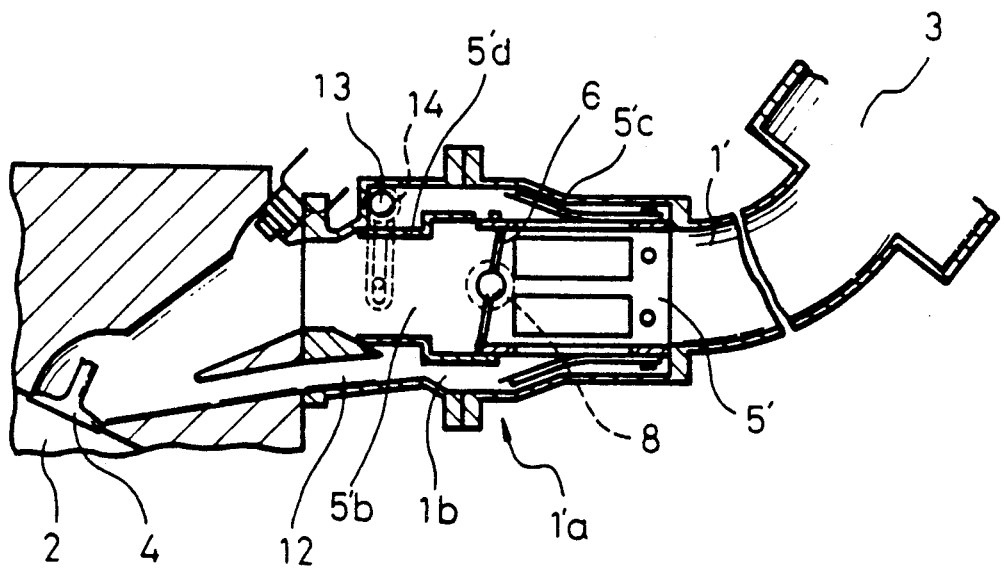
FIG. 6(A) is a schematic view of an intake air control device for a fourth embodiment in a low engine speed and low engine load driving condition.

FIG. 6 shows a fourth embodiment wherein the difference between the fourth and third embodiments is the arrangement of a reed valve assembly 5'. As shown in FIG. 6(A), the reed valve assembly 5' is divided into an upstream portion and a downstream portion 5'd. The upstream portion is formed in the same way as the upstream portion of the reed valve assembly 5 used in the third embodiment, and is fixed in the enlarged portion 1'a of the intake passage 1', but the downstream portion 5'd is formed so as to slide in the longitudinal direction on the upstream portion to thus omit the second control valve 7 used in the third embodiment.

Figure 6B:
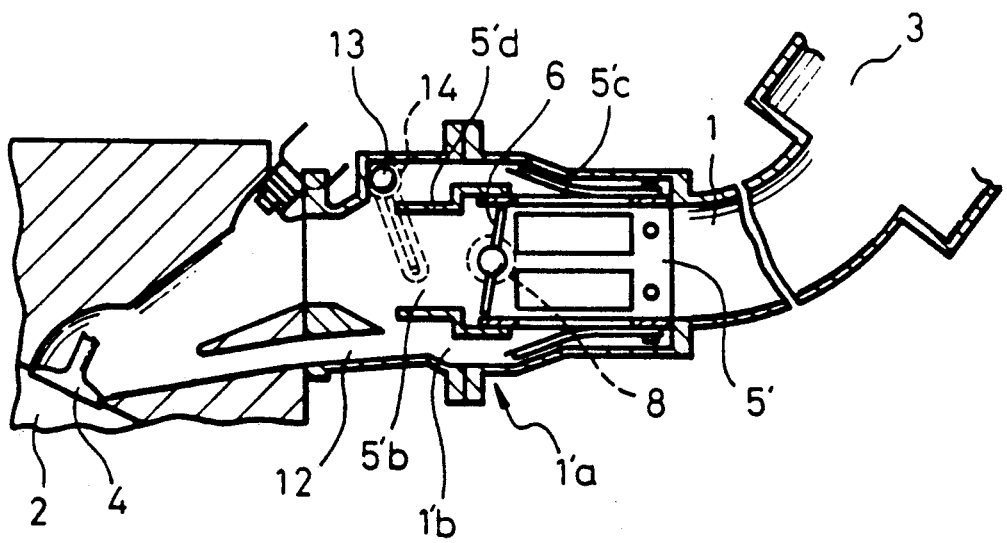
FIG. 6(B) is a schematic view similar to that of FIG. 6(A) in a low engine speed and high engine load or a middle engine speed driving condition.
Figure 6C:
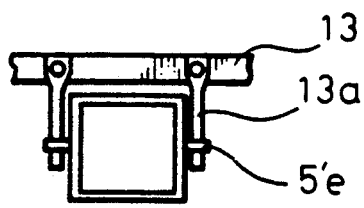
FIG. 6(C) is a front view of a downstream portion of a reed valve assembly body; and, FIG. 7 is a line graph of a generated engine torque with respect to a engine speed.

FIG. 6(C) shows a front view of the downstream portion 5'd. As shown in the figure, the downstream portion 5'd is mounted with pins 5'e in two side walls thereof respectively, and the pins 5'e are engaged with slits of arms 13a fixed at a pivot shaft 13, connected to a step motor 14. The ECU (not shown) as the unit 100'in the third embodiment, actuates the step motor 8 for the first control valve 6, and the step motor 14 for the pivot shaft 13, instead of the step motor 9 for the second control valve 7, in response to a current engine speed and engine load driving condition.

When the current engine driving condition is a low engine speed and low engine load driving condition, the first control valve 6 is closed and the downstream portion 5'd of the reed valve assembly 5' is slid in the downstream direction by the step motors 8 and 13 respectively as shown in FIG. 6(A). Accordingly, the inside space 5'b of the reed valve assembly body is closed by the first control valve 6 and the space 1'b surrounding the reed valve assembly 5' interrupts the inside space 5'b by the downstream portion 5'd, whereby the intake air via the reed valves 5'c is supplied to the combustion chamber 2 to pass only through the subintake passage 12, so that a swirl is created therein as in the third embodiment.

Once the desired amount of intake air is increased to raise an engine speed and/or load, the first control valve 6 is held closed and the downstream portion 5'd of the reed valve assembly 5' is slid in the upstream direction by the step motors 8 and 13 respectively, as shown in FIG. 6(B), whereby the intake air via the reed valves 5'c is supplied and passes through the inside space 5'b of the reed valve assembly body.

When the engine speed raises further to reach a high engine speed, the first control valve 6 is opened and the downstream portion 5'd is slid in the downstream direction, whereby the intake passage 1' has a substantially uniform section.

Thus, the fourth embodiment can obtain the same effects as the third embodiment, and the arrangement of the reed valve assembly 5' is available for the first embodiment without a subintake passage.

According to the present invention, when in the low or middle engine speed driving condition, the higher torque is usually obtained to increase the charging efficiency, and a back flow of intake air and exhaust gases is prevented by the reed valves and the first control valve, and when in the high engine speed driving condition, the higher torque also can be obtained to increase the charging efficiency by the inertia supercharging, because the intake passage between the intake valve and the surge tank has a substantially uniform section.

Furthermore, due to the provision of the subintake passage in the intake air control device, in addition to the above effects, when in a low engine speed and low engine load driving condition, a good combustion can be obtained so that a swirl is created in the combustion chamber and a back flow of intake air and exhaust gases is prevented.

Although the invention has been described with reference to specific embodiments thereof, it should be apparent that numerous modifications can be made thereto by those skilled in the art, without departing from the basic concept and scope of the invention.

We claim:

1. An intake air control device for an internal combustion engine comprising:
    an intake passage having a predetermined length and a substantially uniform section, except for an enlarged portion relatively close to an intake valve;
    a reed valve assembly arranged in said enlarged portion, and having side walls which divide an inside space of said enlarged portion into a first space surrounding said side walls and a second space surrounded by said side walls, to provide a section similar to said uniform section, and on which are mounted reed valves allowing an intake air to flow only from upstream to said first space;
    closing means for normally closing said second space downstream of said reed valves;
    communicating means for normally communicating said first space with said second space downstream of said closing means;
    first detection means for detecting a current engine speed condition;
    first control means for controlling said closing means in response to said current engine speed condition, to open said second space when the current engine speed condition is a high engine speed condition; and
    second control means for controlling said communicating means in response to said current engine speed condition, to interrupt said first space with said second space when the current engine speed condition is a high engine speed condition.

2. An intake air control device according to claim 1, wherein said enlarged portion of said intake passage is formed such that a section thereof is gradually enlarged from the upstream and downstream directions thereof.

3. An intake air control device according to claim 1, further comprising:
   a subintake passage communicating said first space with said intake passage at a point close to said intake valve, to create a swirl in a combustion chamber; and
   second detection means for detecting a current engine load condition,
   wherein said second control means controls said communicating means to interrupt said first space with said second space when the current engine speed and engine load condition is a low engine speed and low engine load condition.

4. An intake air control device according to claim 3, wherein said second control means controls said communicating means to partly communicate said first space with said second space corresponding to the current engine load when the current engine speed and engine load condition is a low engine speed and middle engine load condition.

5. An intake air control device according to claim 3, wherein said intake passage is divided into two downstream of said reed valve assembly, and leads to said combustion chamber via two intake valves, said subintake passage communicating said first space with said intake passage at a point close to one side of said two intake valves.

6. An intake air control device according to claim 1, wherein said closing means is a normally-closed first control valve.

7. An intake air control device according to claim 1, wherein said communicating means is at least one normally-open second control valve is mounted at said side wall of said reed valve assembly downstream of said closing means.

8. An intake air control device according to claim 1, wherein said communicating means is a downstream portion of said reed valve assembly able to slide on an upstream portion of said reed valve assembly in a longitudinal direction, said upstream portion being provided with said reed valves and said closing means.

9. An intake air control device according to claim 1, wherein said side walls of said reed valve assembly define a hollow polygonal column.

10. An intake air control device according to claim 1, wherein said side walls of said reed valve assembly define a hollow square column.

11. An intake air control device according to claim 1, wherein each of said side walls is mounted with said reed valve.

12. An intake air control device according to claim 1, wherein each of said side walls is mounted with a pair of said reed valves.

* * * * *

UNITED STATES PATENT AND TRADEMARK OFFICE
CERTIFICATE OF CORRECTION

PATENT NO. : 5,179,917
DATED : January 19, 1993
INVENTOR(S) : Yuichi HOKAZONO, et al.

It is certified that error appears in the above-indentified patent and that said Letters Patent is hereby corrected as shown below:

Column 2, line 46, change "a" to --an--.

Column 2, line 57, change "an other" to --another--.

Column 2, line 67, change "in" to --in---.

Column 2, line 68, change "ake" to --take--.

Column 5, line 22, change "raises" to --rises--.

Column 6, line 3, change "raises" to --rises--.

Column 8, line 6, delete "is".

Signed and Sealed this

Thirtieth Day of May, 1995

Attest:

BRUCE LEHMAN

Attesting Officer

Commissioner of Patents and Trademarks